July 22, 1969 A. H. BOBECK 3,457,551
MATRIX LOAD SELECTION CIRCUIT HAVING MEANS FOR CANCELLING NOISE
Filed Sept. 28, 1965 2 Sheets-Sheet 1

INVENTOR
A. H. BOBECK
BY Herbert M. Shapiro
ATTORNEY

July 22, 1969 A. H. BOBECK 3,457,551

MATRIX LOAD SELECTION CIRCUIT HAVING MEANS FOR CANCELLING NOISE

Filed Sept. 28, 1965 2 Sheets-Sheet 2

3,457,551
Patented July 22, 1969

3,457,551

MATRIX LOAD SELECTION CIRCUIT HAVING MEANS FOR CANCELLING NOISE

Andrew H. Bobeck, Chatham, N.J., assignor to Bell Telephone Laboratories, Incorporated, New York, N.Y., a corporation of New York Filed Sept. 28, 1965, Ser. No. 490,964
Int. Cl. H04q 1/36
U.S. Cl. 340—166 13 Claims

ABSTRACT OF THE DISCLOSURE

An access switching matrix for a magnetic memory is disclosed. A center tapped transformer provides opposite voltages in adjacent word conductors of the memory during a select operation thus eliminating common made noise.

Figure 1:
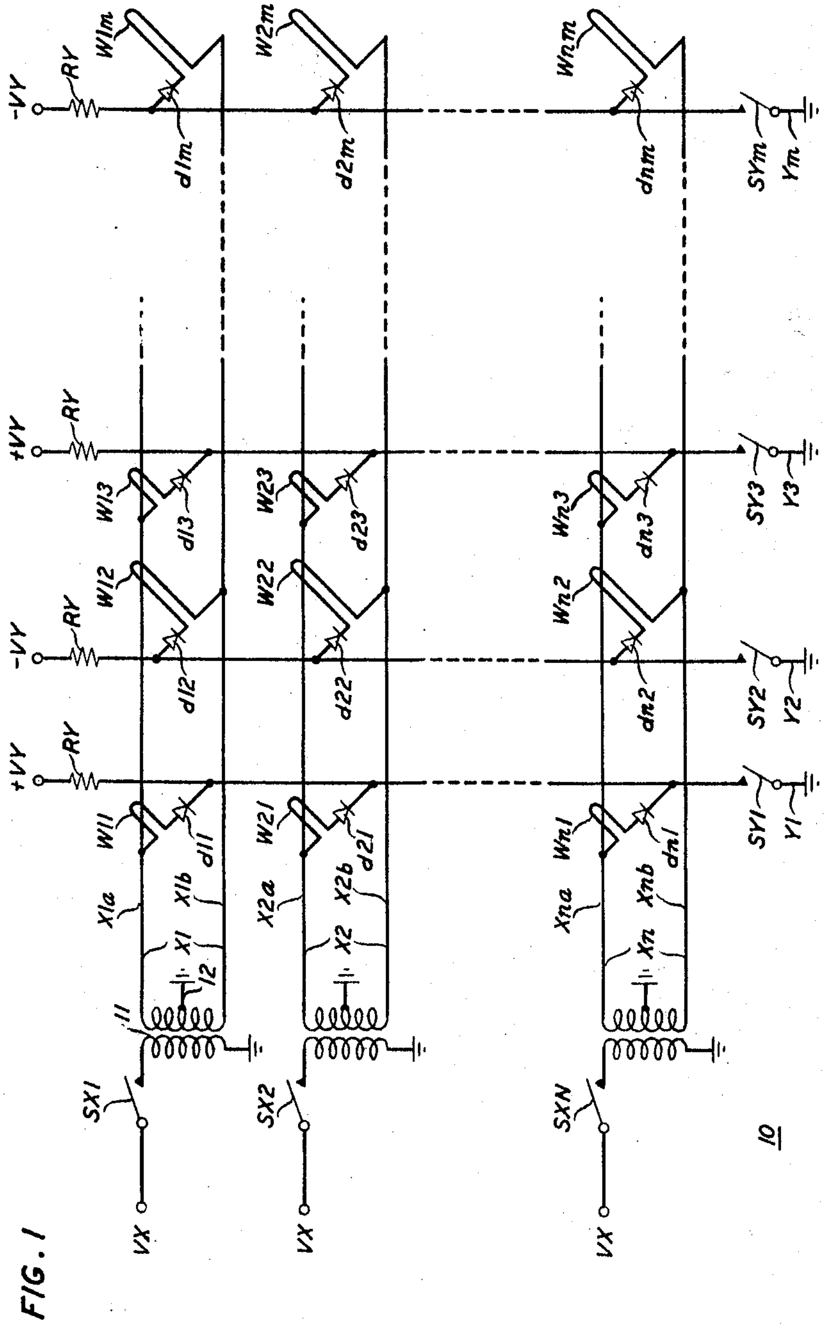

This invention relates to information stores and, more particularly, to circuits for the suppression of noise therein.

Selection switches employing, for example, diodes at crosspoints therein are generally preferred over biased-core access switches for memory access because of the higher operating speed capabilities thereof, as is well known. Diode selection switches, however, do not provide the electrical isolation characteristic of biased-core switches. Specifically, in accessing word-organized memories, voltage changes occurring in the coordinate conductors of the access switch during word selection operations produce currents in digit conductors of the memory. These currents accumulate along digit conductors and result in spurious output signals. The coupling from the access circuit to the digit conductors is due to distributed capacitance between coordinate word and digit conductors of the memory. Specifically, voltage changes in coordinate conductors of the access switch during a "select" operation permit that distributed capacitance to discharge. Consequently, currents flow in like directions in corresponding digit conductors and the return path therefor. The resulting signal (noise) is commonly termed "common mode noise," the phenomenon being well understood. (See "Electronic Design," Aug. 3, 1964, page 38 et seq.)

Common mode noise is rejected, in accordance with prior art teaching, most simply, by threading each digit conductor and its return path through a nonsaturable magnetic core. In this manner, common mode currents flowing in the digit conductor and the return path "see" a high impedance which reduces (balances) the "noise" in detectors connected thereto. The magnetic cores are termed "common mode chokes" or "baluns."

Unfortunately, this common mode rejection arrangement alone frequently has been found inadequate. The inadequacy of such a circuit is particularly apparent in large capacity memories and/or high speed memories. The primary reason for the inadequacy is that common mode current components follow paths of slightly different length through digit conductors and the return paths therefor. Those current components, consequently, arrive at the balun at slightly different times and are not properly balanced there. The larger the memory and/or the faster the operation thereof, the more significant the imbalance.

An object of this invention is an access switch arrangement which introduces only negligible common mode currents into the memory circuit.

The foregoing and further objects and features of this invention are realized in one embodiment thereof wherein an access switch for a word-organized magnetic memory is organized in such a fashion that adjacent word conductors of the memory experience voltage excursions of opposite polarity during a select operation. In this manner, currents flowing because of the discharge of distributed capacitance between one word conductor and an associated digit conductor serve to charge the distributed capacitance between the next adjacent word conductor and that digit conductor. Consequently, common mode currents flow, essentially, only locally between adjacent word conductors via an associated digit conductor causing only negligible "noise" in detectors connected to the digit conductor.

A feature of this invention is an access switch including conductors along one coordinate thereof and means for applying to adjacent ones of those conductors pulses of opposite polarity during a select operation.

Another feature of this invention is an access switch in which output circuits (memory word conductors) are connected to adjacent conductors along one coordinate thereof in a manner to experience opposing voltage excursions during a select operation.

Figure 2:
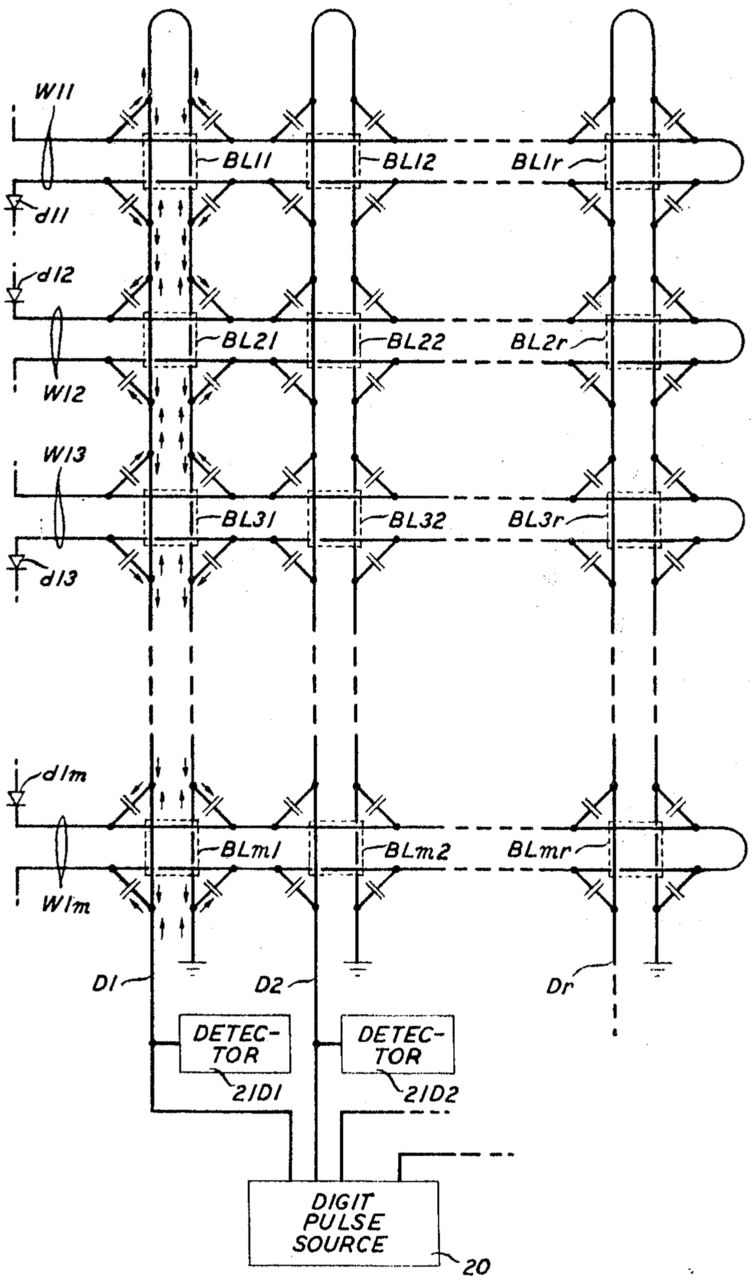

The foregoing and further objects and features of this invention will be understood more fully from a consideration of the following detailed description rendered in conjunction with the accompanying drawing in which:

FIG. 1 is a schematic illustration of an access switch in accordance with this invention; and FIG. 2 is a schematic illustration of a portion of a magnetic memory driven by the access switch of FIG. 1.

Specifically, FIG. 1 shows an illustrative diode matrix selection switch 10 including $x$ coordinate conductors referenced $x1$, $x2$, . . . $xn$ and $y$ coordinate conductors referenced $y1$, $y2$, . . . $ym$ between coordinate pairs of which diodes $d11$ . . . $dnm$ are connected, corresponding to crosspoints there. The diode designations include numeral designations corresponding to the $x$ and $y$ conductors, respectively, to which each is connected. Each $x$ conductor, illustratively, in acordance with this invention, comprises a pair of conductors connected to opposite ends of a transformer secondary 11 having a grounded center tap 12. The individual $x$ conductors are identified by an additional symbol $a$ or $b$. Thus, for example, conductor $x1$ comprises two conductors $x1a$ and $x1b$.

The diodes associated wth the odd numbered $y$ coordinate conductors are poled to permit current to flow from the $x$ conductors into the $y$ conductors. The figure shows the anode portion of each diode separated from the connection thereof to the corresponding $x$ conductor by conductive loops designated $w11$ . . . $wn1$ and $w13$ . . . $wn3$, illustratively as above, which loops serve first as output circuits of the access switch and, importantly, as word conductors of a word-organized memory driven by that access switch.

The diodes associated with the even numbered $y$ coordinate conductors are poled to permit current to flow from the $y$ conductors into the $x$ conductors. The figure shows the cathode portion of each diode separated from the connection thereof to the corresponding $x$ conductor by conductive loops designated $w12$ . . . $wn2$ and $w1m$ . . . $wnm$, illustratively as above, which loops also serve as word conductors.

As was already stated, each pair of $x$ conductors is connected to opposite ends of a transformer secondary the primaries of those transformers are connected individually between a voltage source, via corresponding normally open switches $Sx1$, . . . $Sxn$, and ground. The voltage source at each primary is indicated by a $Vx$ sign. The $y$ conductors are connected through corresponding normally open switch $Sy1$, $Sy2$, . . . $Sym$, to ground at one end and, through a resistance $Ry$, to sources of positive and negative voltages, designated $+Vy$ and $-Vy$, at the other for odd and even numbered $y$ conductors, respectively. A like positive voltage may be applied to the individual $x$ and $y$ conductors.

FIG. 2 shows a plane of a generalized three-dimensional memory driven by the access switch of FIG. 1. The figure shows a plurality of word conductors *w*11 . . . *w*1*m* also appearing in FIG. 1. Orthogonal to these conductors is a plurality of digit conductors, designated *d*1 . . . *dr*. The digit conductors are connected between a digit pulse source 20 and individual detectors 21*d*1, 21*d*2 . . . at one end and ground at the other. Word and digit conductors intersect to form crosspoints which typically correspond to bistable magnetic elements represented by broken squares designated BL11 . . . BL*mr* (bit location). It is noted that each word conductor includes a return path, not separately designated. Only one plane of a memory is illustrated in FIG. 2 for simplicity. Other planes in the memory are identical. Distributed capacitance between word and digit conductors in the memory is indicated by four capacitance symbols at the various crosspoints.

The efficacy of this invention is demonstrated by showing that the selection of a word conductor during, for example, a read operation results in only negligible capacitive coupled currents flowing to or from ground in digit conductors of the memory. Attention is focused on the read operation because the explanation of the operation may be related without the distraction of a consideration of concurrent digit pulses applied during a write operation and because outputs are ignored except during a read operation. The explanation, however, is applicable to word selection during write operations also.

Illustratively, it is assumed that word conductor *w*11 is selected. To this end, switch S*x*1 and switch S*y*1 are closed under the control of a suitable control circuit (not shown). Such operation of an access switch as well as the operation of word-organized memories in response is well known and a discussion thereof is not necessary for an understanding of this invention. Suffice it to say that a read pulse is applied to conductor *w*11 during a read operation. To this end, the various detectors, pulse sources, diodes, magnetic elements, et cetera, may be any such elements capable of operation in a conventional mode for diode selection switches and word-organized memories.

In the illustrative operation, conductor *y*1 of access switch 10 experiences a change in potential from a positive voltage +V to ground when switch S*y*1 is closed. Concurrently therewith, conductors *x*1*a* and *x*1*b* experience changes in potential from ground to +V and from ground to −V, respectively. In response to those positive voltage changes, current flows only through diode *d*11 (now forward biased) from the positive potential source connected to conductor *x*1*a* through word conductor *w*11 to ground at the *y*1 conductor.

Although select current flows only in word conductor *w*11, a potential (voltage) change from ground to +V and from ground to −V, respectively, appears in odd and even numbered word conductors associated with the *x*1 coordinate conductor of the access switch, that is, in word conductors *w*11, *w*12, *w*13 . . . *w*1*m*. This change in voltage in the word conductors results in corresponding changes in the level to which the various distributed capacitances in the memory circuit are charged. Specifically, during a select operation (read operation here), word conductor *w*11 goes from ground to +V and the distributed capacitance associated therewith is charged correspondingly from a ground level to a +V level. Importantly, in accordance with this invention, the next adjacent word conductor *w*12 experiences the opposite voltage change. That is to say, conductor *w*12 experiences a change from ground to −V due to the change from ground to −V appearing on conductor *x*1*b*. The distributed capacitance associated therewith, consequently, is "charged" to a −V level. Thus, for each change in a charge of a distributed capacitance between one word conductor and a digit conductor, an equal and opposite change occurs in the distributed capacitance between the next adjacent word conductor and that digit conductor. The result may be rationalized by considering the charge carriers for charging one distributed capacitance as coming from an accompanying discharge of a next adjacent distributed capacitance producing only negligible (localized) effects in the "interconnecting" digit conductor. This is to be contrasted to the supply of those charge carriers from ground through the digit conductor which is the ultimate source of common mode noise in prior art circuits.

A pattern of arrows is associated with the various capacitance symbols about digit conductor *d*1 in FIG. 2. When conductor *w*11 is selected, current flows from the capacitance associated with word conductor *w*11 to that associated with conductor *w*12 as indicated by the arrows directed generally downward, as viewed in connection with the capacitance symbols associated with word conductors *w*11 and *w*12. It is to be noted that the arrows in connection with the capacitance symbols associated with word conductors *w*13 and *w*1*m* are directed oppositely. Current components actually are generated in both directions along the digit conductor at each crosspoint when each of the distributed capacitances there (as symbolized) is charged and discharged. The polarity of those current components is indicated by the direction of the arrows. The direction in which those components are launched is away from the juncture of the capacitance symbol and the digit conductor or the return path. It is noted that the number of arrows directed upward (8) along the digit line equals the number (8) directed downward. Thus the flow of current is shown to be local essentially without a net change. It is to be noted also that each of the word conductors is connected to the access switch to have currents flowing therein in a like manner when that word conductor is selected. Thus, memory operation is entirely analogous to prior art operation and is not in need of further discussion here.

In one specific embodiment in accordance with this invention, a thin film memory comprising 64 words having 32 bits per word was operated with an 8 x 8 diode selection switch. Output signals as about ± one millivolt, representing binary ones and zeros, were achieved, only negligible common mode currents (noise level) being observed. This is to be compared to output signals of about ± one millivolt typical of comparable prior art memories but having a noise level comparable to the signal level.

What is claimed is:

1. In combination, an access switch having crosspoints therein, an output circuit for each of said crosspoints, means including first and second coordinate conductors for activating a particular one of said output circuits, said first coordinate conductor being arranged to cause opposing voltage excursions in adjacent output circuits therealong when activated.

2. A combination in accordance with claim 1 including a diode in series with each output circuit, said diodes being poled alike to permit current to flow in only a first direction through selected output circuits.

3. A combination in accordance with claim 2 wherein said output circuits are word conductors of a word-organized memory.

4. In combination, an access switch including a plurality of first conductors and a plurality of second conductors defining crosspoints with said first conductors, output circuits energy coupled to said crosspoints, means for applying first pulses of opposite polarity to adjacent ones of said first conductors, said output circuits being coupled in a manner to exhibit opposite polarity voltage excursions therein in response to said first pulses, and means for selectively applying opposite polarity pulses to adjacent ones of said second conductors concurrently with said first pulses for activating a particular one of said output circuits.

5. A combination in accordance with claim 1 wherein each of said first coordinate conductors comprises a first and a second conductor.

6. A combination in accordance with claim 5 wherein said first and second conductors are connected to opposite ends of a transformer secondary including a grounded center tap.

7. A combination in accordance with claim 6 wherein adjacent output circuits are connected alternately between said first and said second conductors and corresponding second coordinate conductors.

8. A combination in accordance with claim 7 including a diode connected between each output circuit and the corresponding second coordinate conductor.

9. A combination in accordance with claim 8 wherein said diodes are poled alike to permit current to flow in only a first direction through said output circuits.

10. A combination in accordance with claim 9 wherein said output circuits are word conductors of a word-organized memory.

11. A combination in accordance with claim 10 including a plurality of digit conductors intersecting said adjacent word conductors associated with a selected one of said first coordinate conductors.

12. A combination in accordance with claim 11 including transformer primaries energy coupled to said transformer secondaries and means for selectively applying first pulses to said primaries for driving said first and second conductors to opposite voltage values.

13. A combination in accordance with claim 12 including means for selectively appling second pulses to said second coordinate conductors concurrently with said first pulses.

References Cited

UNITED STATES PATENTS

| | | | |
|---|---|---|---|
| 2,931,015 | 3/1960 | Bonn et al. | |
| 2,946,043 | 7/1960 | Reenstra et al. | 340—166 X |
| 3,093,813 | 6/1963 | Gerbig | 340—166 |
| 3,149,313 | 9/1964 | Merz et al. | |
| 3,164,810 | 1/1965 | Harding. | |
| 3,205,481 | 9/1965 | Corbella | 340—166 |

JOHN W. CALDWELL, Primary Examiner

H. I. PITTS, Assistant Examiner

U.S. Cl. X.R.

179—18.7